(12) United States Patent
Yamaguchi et al.

(10) Patent No.: US 7,020,192 B1
(45) Date of Patent: Mar. 28, 2006

(54) METHOD OF RETRIEVING VIDEO PICTURE AND APPARATUS THEREFOR

(75) Inventors: Noboru Yamaguchi, Yashio (JP); Toshiaki Watanabe, Yokohama (JP); Takashi Ida, Kawasaki (JP); Yoko Sambonsugi, Yamato (JP); Osamu Hori, Yokohama (JP); Toshimitsu Kaneko, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/363,881

(22) Filed: Jul. 30, 1999

(30) Foreign Application Priority Data

Jul. 31, 1998  (JP) ............................... 10-217408

(51) Int. Cl.
*H04B 1/66* (2006.01)

(52) U.S. Cl. ............ 375/240; 375/240.25; 375/240.26; 375/240.08; 375/240.16; 348/699; 382/233; 382/243; 382/238; 382/236

(58) Field of Classification Search ................ 375/240, 375/240.16, 240.12, 240.25, 240.29, 240.13, 375/240.24, 240.02, 240.08, 240.26; 382/243; 382/154, 232, 233, 236, 238, 224, 235, 239; 348/699, 416, 420, 700
See application file for complete search history.

(56) References Cited

U.S. PATENT DOCUMENTS

| | | | | |
|---|---|---|---|---|
| 5,978,048 A * | 11/1999 | Lee | .............................. | 348/699 |
| 6,011,872 A * | 1/2000 | Qian et al. | .................. | 382/243 |
| 6,049,567 A * | 4/2000 | Han | ........................ | 375/240.16 |
| 6,055,330 A * | 4/2000 | Eleftheriadis et al. | ...... | 382/154 |
| 6,055,335 A | 4/2000 | Ida et al. | | |
| 6,301,303 B1 * | 10/2001 | Chung et al. | .......... | 375/240.22 |
| 6,335,985 B1 | 1/2002 | Sambonsugi et al. | | |
| 6,377,309 B1 * | 4/2002 | Ito et al. | ..................... | 348/554 |
| 6,381,277 B1 * | 4/2002 | Chun et al. | ............ | 375/240.12 |
| 6,389,168 B1 * | 5/2002 | Altunbasak et al. | ........ | 382/224 |
| 6,408,025 B1 * | 6/2002 | Kaup | .................... | 375/240.02 |

OTHER PUBLICATIONS

Anil K. Jain, et al. "Shape-Based Retrieval: A Case Study with Trademark Image Databases," Pattern Recognition, vol. 31, No. 9, 1998, pp. 1369-1390.
T. Ebrahimi, Signal Processing: Image Communication, vol. 9, No. 4, pp. 367-384, XP-004075336 "MPEG-4 Video Verification Model: A Video Encoding/Decoding Algorithm Based on Content Representation", May 1, 1997.
J. Meng, et al., Proceedings of Acm Multimedia 96., pp. 43-53, XP-000734708, "CVEPS-A Compressed Video Editing adn Parsing System", Nov. 18, 1996.

(Continued)

*Primary Examiner*—Shawn S. An
(74) *Attorney, Agent, or Firm*—Oblon, Spivak, McClelland, Maier & Neustadt, P.C.

(57) ABSTRACT

An apparatus for retrieving a video picture includes a decoder section for decoding a coded bit stream of video picture data representing an arbitrary shape object and including shape information and texture information, a retrieval condition input section for inputting a retrieval condition for retrieval of a desired picture, a retrieval section for retrieving a picture meeting the retrieval condition by using shape information of the object decoded by the decoder section, and a display section for outputting the retrieved result obtained by the retrieval section.

20 Claims, 4 Drawing Sheets

OTHER PUBLICATIONS

M. Flickner, et al., Computer, IEEE COmputer Society, vol. 28, No. 9, pp. 23-32, XP-000673841, "Query by Image and Video Content: The QBIC System", Sep. 1, 1995.

J. Signes, International Organisation for Standardisation Organisation Internationale de Normalisation ISO/IEC JTC1/SC29/WG11 Coding of Moving Pictures and Audio, (ISO/IEC JTC1/SC29/WG11 N1786 MPEG97), 6 pages, XP-000997689, "MPEG-4 Systems Methodology and Work Plan for Scene Description", Jul. 1997.

International Organization for Stadardization Organisation Internationael de Normalisation, pp. 3-49, XP-002047798, "Munich Meeting of MPEG-4 Working Group. Report ISO/IEC JTC1/SC29/WG11MPEG-4/N1172", 1996.

M. A.-Mottaleb, et al., Philips Journal of Research, vol. 50, No. 1, pp. 227-251, XP-004008214, "Aspects of Multimedia Retrieval", 1996.

* cited by examiner

FIG. 2A
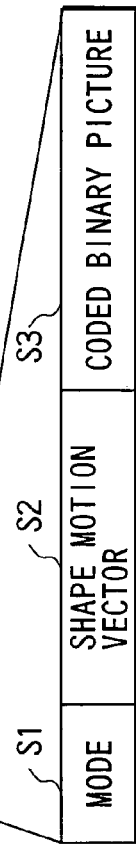
FIG. 2B
FIG. 2C
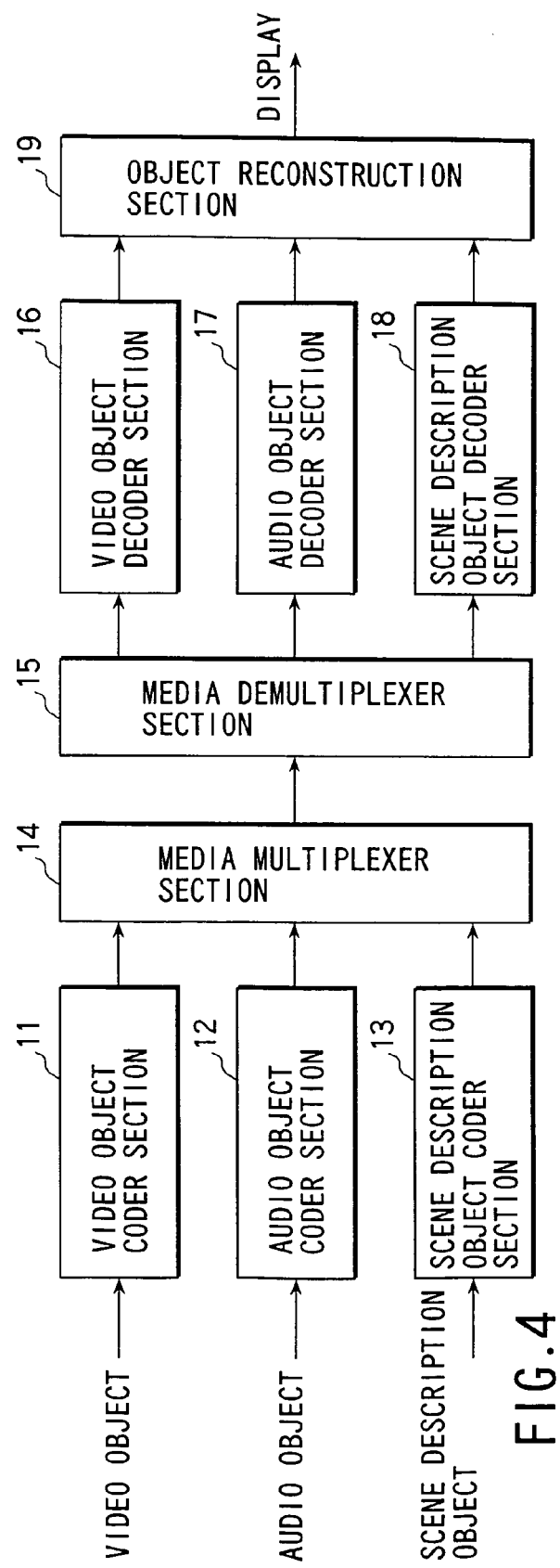
FIG. 4

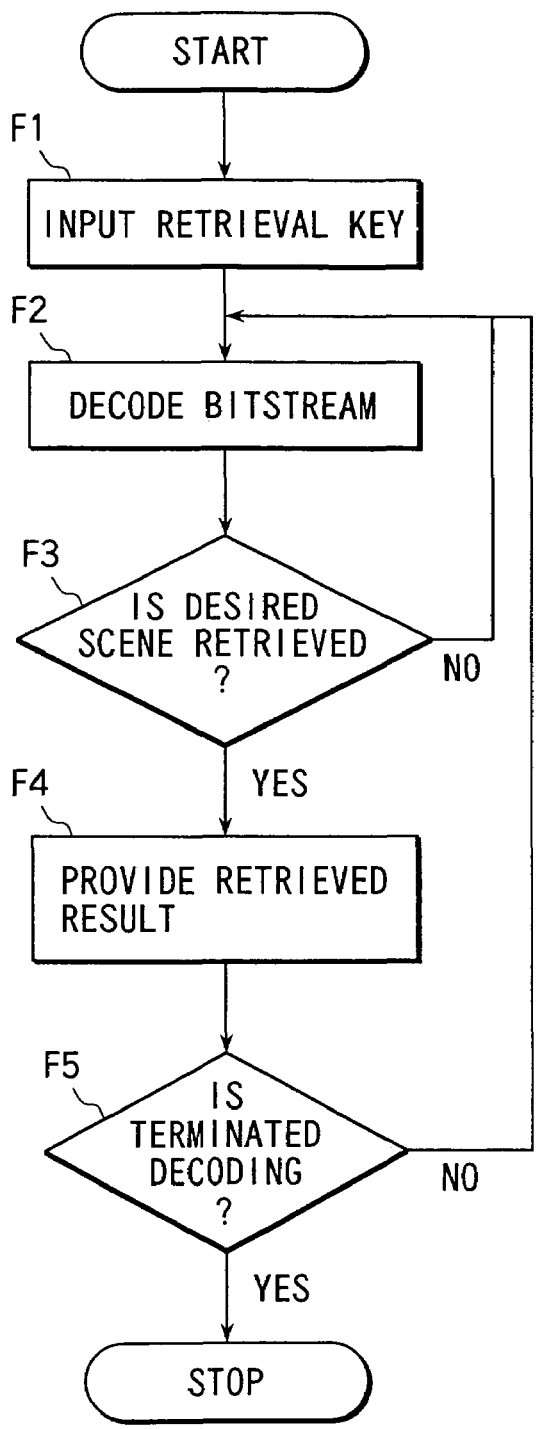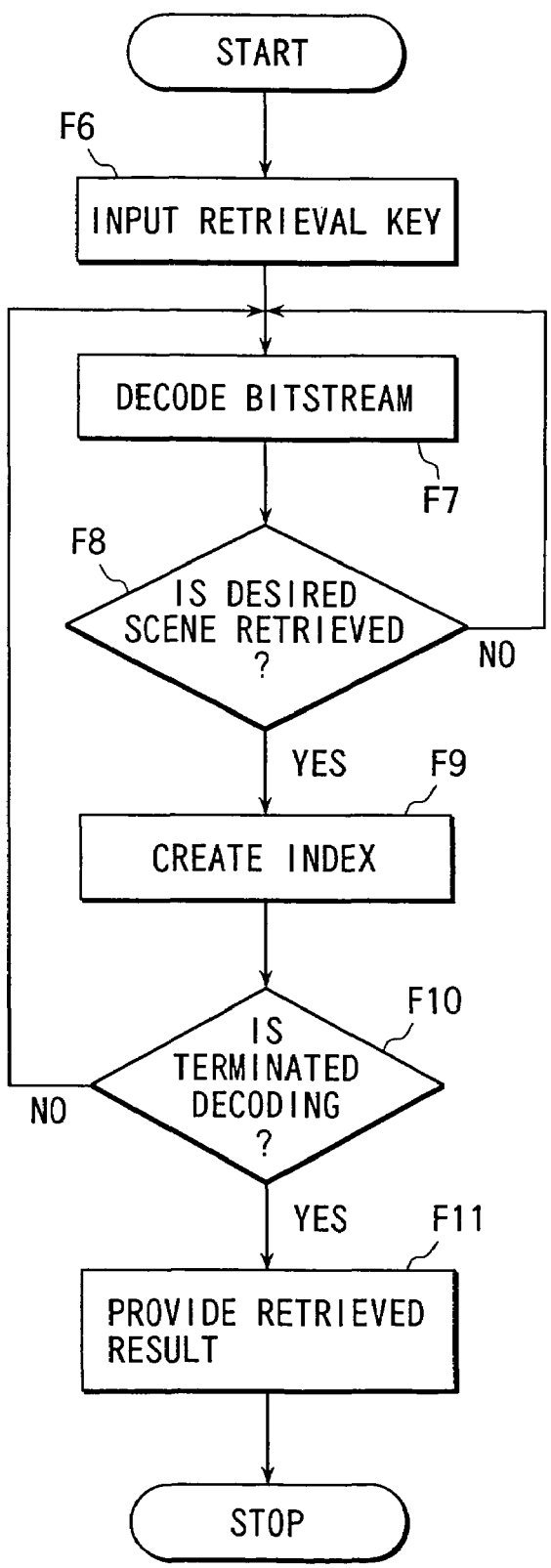
FIG. 7A
FIG. 7B

METHOD OF RETRIEVING VIDEO PICTURE AND APPARATUS THEREFOR

BACKGROUND OF THE INVENTION

The present invention relates to a retrieval technique for video data and, more particularly, to a method of retrieving a video picture and apparatus therefor, which use the function of coding a video picture in units of arbitrary shape objects and are implemented by MPEG4 as an internal standard scheme for video coding in the process of standardization in ISO/IECJTC/SC29/WG11.

According to MPEG4 in the process of standardization, the function of coding a video picture in units of arbitrary shape objects (e.g., a human figure in a picture), which cannot be implemented by MPEG1 or MPEG2 that is a conventional international standard scheme for video coding, can be implemented.

To implement this function, information representing the shape or size of each object is required. This information is coded together with texture information representing changes in luminance and chrominance inside each object, and the resultant data is transmitted or stored.

In a conventional video picture retrieving technique, a change in luminance in a frame (e.g., edge information), change in luminance between frames (e.g., optical flow), or the like is detected, and video sequences are classified by checking changes in these pieces of information. An index for retrieval is assigned to each classified group.

When these processes are performed by a decoder apparatus, a complicated signal processing unit is often required after a reconstructed picture is generated. For this reason, techniques of reducing the processing amount by analyzing a video picture on the basis of motion vector information obtained in the process of generating a reconstructed picture or DCT (Discrete Cosine Transform) coefficient information have also been proposed (for example, Jpn. Pat. Appln. KOKAI Publication Nos. 6-113280 and 7-152779 and Japanese Patent Application No. 8-178778).

In any case, there is a limit to the technique of analyzing video pictures in units of frames and retrieving a video picture, with high precision.

When a video picture is to be retrieved from conventional coded video data (MPEG1 or MPEG2), since retrieval processing is performed in units of frames as minimum units, it is difficult to perform video picture retrieval with high precision.

In contrast to this, according to MPEG4, retrieval processing can be performed in units of objects in each frame as minimum units.

BRIEF SUMMARY OF THE INVENTION

It is an object of the present invention to provide a method of retrieving a video picture and apparatus therefor, which are designed to process a video picture using MPEG4 as a video coding scheme, detect the size, shape, and motion of each object and its position in a picture by using the shape information of each object of a coded bit stream based on MPEG4, and can perform high-precision video picture retrieval by using these information without using any complicated signal processing unit.

According to the present invention, there is provided a method of retrieving a video picture, comprising decoding a coded bit stream of video data representing an arbitrary shape object and including shape information and texture information, and supplying a retrieval condition for retrieval of a desired picture and retrieving a picture meeting the retrieval condition by using shape information of the object decoded by the above decoding.

According to the present invention, there is provided an apparatus for retrieving a video picture, comprising a decoder section which decodes a coded bit stream of video picture data representing an arbitrary shape object and including shape information and texture information, a retrieval condition input section which inputs a retrieval condition for retrieval of a desired picture, and a retrieval section which retrieves a picture meeting the retrieval condition by using shape information of the object decoded by the decoder section.

According to the present invention, there is provided a method of retrieving a video picture, comprising decoding a coded bit stream of an arbitrary shape object including shape information and texture information and corresponding to video data coded by MPEG4 when retrieving a desired picture from the video data coded by MPEG4, retrieving a video picture meeting a supplied retrieval condition for retrieval of a desired video picture by using shape information of a decoded object, and presenting a retrieved result.

According to the present invention, there is provided a video picture retrieving apparatus for retrieving a desired picture from video data coded by MPEG4, comprising a decoder section for decoding a coded bit stream of an arbitrary shape object which includes shape information and texture information and corresponds to video data coded by MPEG4, a retrieval condition input section which inputs a retrieval condition for retrieval of a desired picture, a retrieval section which retrieves a video picture meeting a retrieval condition by using the shape information of the object decoded by the decoder section, and an output section which presents a retrieved result obtained by the retrieval section.

According to the present invention, there is provided a method of retrieving a video picture and apparatus therefor, which can perform sophisticated video picture retrieval in consideration of the contents of a picture by using shape information (size, shape, motion, and position in a picture) of each object without using any complicated signal processing section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2C are views for explaining the arrangement of coded shape data in detail;

FIG. 4 is a block diagram for explaining an outline of an MPEG4 system;

FIGS. 7A and 7B are flowcharts showing two processes of providing a retrieved result to a user.

DETAILED DESCRIPTION OF THE INVENTION

A video picture retrieving apparatus according to an embodiment of the present invention will be described below with reference to the views of the accompanying drawing.

A shape information coding technique used in the present invention will be briefly described first.

A shape information coding method in MPEG4 is described in "Standardization Trends in MPEG4 for Multimedia", The Journal of The Institute of Image Information and Television Engineers, Vol. 51, No. 12, pp. 1984–1986, 1997.

According to this reference, in MPEG4 as an international standard video coding scheme, picture information is coded in units of macroblocks each containing shape information in addition to texture information as video data. In this case, a macroblock is one of the blocks obtained by dividing picture information in "16×16" pixels. This picture information is expressed by binary data called an alpha-map prepared as information indicating the shape and distribution of an object in texture information as video data.

Figure 1:
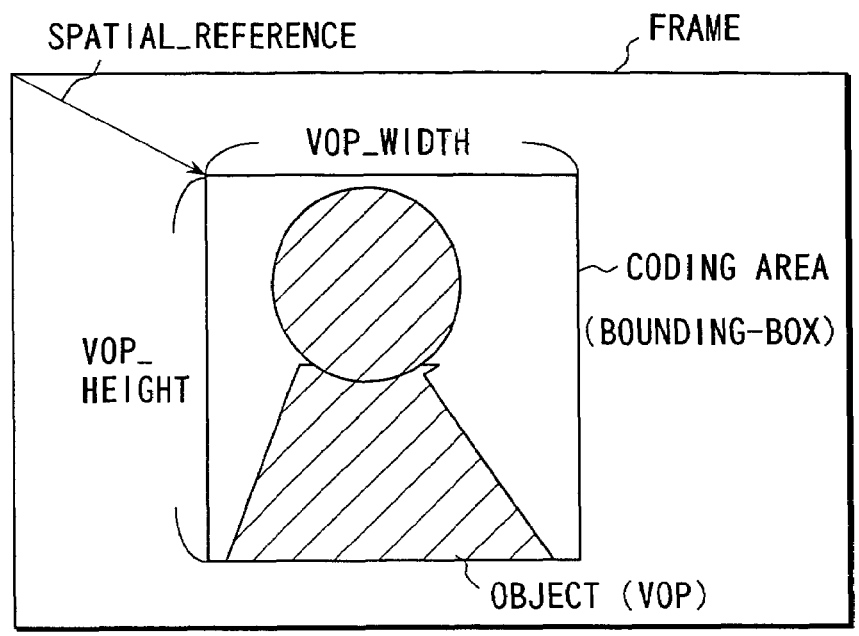
FIG. 1 is a view for explaining a coding area including an object.

A coding area containing an object in MPEG4 will be described with reference to FIG. 1. As shown in FIG. 1, a coding area (called a Bounding-Box or Bounding-Rectangle) containing an object (called a VOP (Video Object Plane) in MPEG4) as a coding target is set in a picture (frame), and this area is divided into "16×16"-pixel blocks. The object is then coded in units of "16×16"-pixel blocks, i.e., macroblocks.

In this case, the sizes (vop_width, vop_height) and position vectors (spatial_reference (vop_horizontal_mcspatial_ref, vop_vertical_mc_spatial_ref)) of Bounding-Boxes are coded in units of VOPs.

FIGS. 2A, 2B, and 2C show the format of coded data. This format corresponds to the arrangement of coded data in MPEG4 (see "Standardization Trends in MPEG4 for Multimedia", The Journal of The Institute of Image Information and Television Engineers, Vol. 51, No. 12, p. 1974, 1997). According to the format shown in FIG. 2A, the header information of each frame is written, and a macroblock follows this header information. As shown in FIG. 2B, each macroblock includes shape information A1, motion vector information A2, and DCT coefficient information A3. As shown in FIG. 2C, the shape information A1 includes mode information S1, shape motion vector information S2, and coded binary picture information S3.

The mode information S1 is information indicating the attribute of each macroblock. The shape motion vector information S2 is motion vector information for motion compensation prediction of the shape of each macroblock. The coded binary picture information S3 is information obtained by handling the detailed shape of each macroblock as a binary picture and coding the binary picture.

Figure 3:
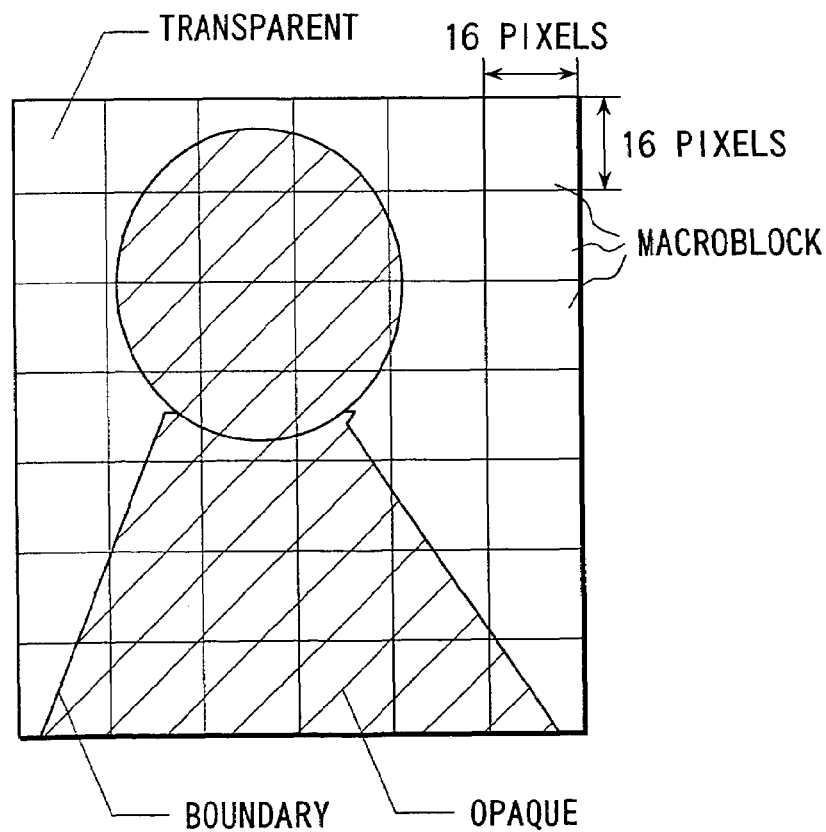
FIG. 3 is a view for explaining the attribute of each macroblock.

The attribute of each macroblock will be described next with reference to FIG. 3. Macroblocks are classified into three types, i.e., a "transparent macroblock" in which the 16×16 pixels include no object pixel; an "opaque macroblock" in which all the 16×16 pixels are object pixels; and a "boundary macroblock in which some of the 16×16 pixels are object pixels.

In MPEG4, the mode information S1 of the shape information A1 is used to define the following seven modes:

(mode 1; MOOD 1) transparent
(mode 2; MOOD 2) opaque
(mode 3; MOOD 3) coded binary picture
   (intraframe)
(mode 4; MOOD 4) motion compensation (MV=0)
(mode 5; MOOD 5) motion compensation (MV=0)+
   coded binary picture
   (interframe)
(mode 6; MOOD 6) motion compensation (MV≠0)
(mode 7; MOOD 7) motion compensation (MV≠0)+
   coded binary picture
   (interframe)

MOOD 1 indicates that the macroblock is a transparent macroblock. MOOD 2 indicates that the macroblock is an opaque macroblock. MOOD 3 indicates that the macroblock is coded binary picture (intraframe) information. MOOD 4 indicates the macroblock is zero motion vector information (MV=0). MOOD 5 indicates that the macroblock is constituted by zero motion vector information and non-zero motion vector information (MV≠0). MOOD 7 indicates that the macroblock is constituted by non-zero motion vector information and coded binary picture (interframe) information.

The shape motion vector information S2 appears when mode 6 (MOOD 6) and mode 7 (MOOD 7) are set. The coded binary picture information S3 appears when mode 3 (MOOD 3) and mode 7 (MOOD 7) are set.

According to the present invention, a target scene designated by a user is retrieved by using such mode information and shape motion vector information in shape information in MPEG4.

An MPEG4 system is disclosed in "Standardization Trends in MPEG4 for Multimedia", The Journal of The Institute of Image Information and Television Engineers, Vol. 51, No. 12, p. 1962, 1997. An outline of the MPEG4 system will be briefly described below. The MPEG4 system has an arrangement like the one shown in FIG. 4.

As shown in FIG. 4, in the MPEG4 system, a coder apparatus is comprised of a video object coder section 11 for coding a video object, an audio object coder section 12 for coding an audio object, a scene description object coder section 13 for coding a scene description object, and a media multiplexer section 14 for multiplexing and transmitting these coded objects.

A decoder apparatus is comprised of a media demultiplexer section 15, a video object decoder section 16, an audio object decoder section 17, a scene description object decoder section 18, and an object reconstruction section 19. The media demultiplexer section 15 demultiplexes the multiplex data transmitted from the coder apparatus to obtain the original video object, an audio object, and a scene description object. The video object decoder section 16 decodes the coded video object demultiplexed by the media demultiplexer section 15 into the original video object. The audio object decoder section 17 decodes the coded audio object demultiplexed by the media demultiplexer section 15 into the original audio object. The scene description object decoder section 18 decodes the coded scene description object demultiplexed by the media demultiplexer section 15 into the original scene description object. The object reconstruction section 19 synthesizes the video and audio objects in accordance with the scene description object to reconstruct the picture to be displayed.

In the arrangement shown in FIG. 4, the supplied video and audio objects and the like are respectively coded by the corresponding coder sections 11 and 12. The media multiplexer section 14 multiplexes these coded objects with the scene description object, which is obtained by the scene description object coder section 13 and describes how the respective objects are synthesized and provided to a user. The multiplex bit stream is then transmitted or stored.

On the decoder apparatus side, the media demultiplexer section 15 demultiplexes this transmitted or stored bit stream into the respective objects. These objects are then reconstructed into the original objects by the corresponding object decoder sections 16, 17, and 18. Thereafter, the object reconstruction section 19 synthesizes these objects in accordance with the scene description, and the display section presents the resultant information to the user.

The present invention will be described below with reference to the views of the accompanying drawing in consideration of the above outline of the MPEG4 system.

Figure 5:
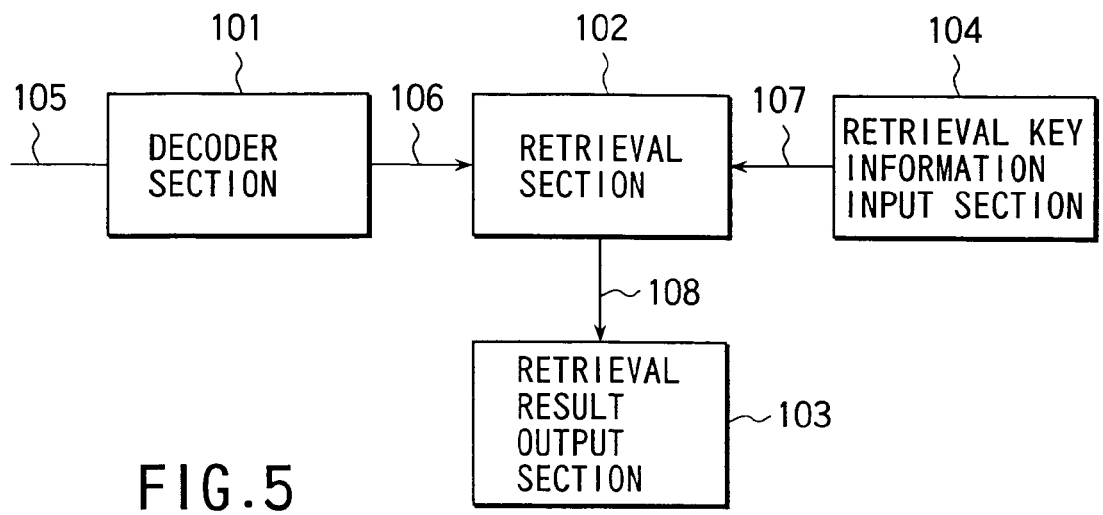
FIG. 5 is a block diagram showing the schematic arrangement of a video picture retrieving apparatus according to an embodiment of the present invention.

A video picture retrieving apparatus according to an embodiment of the present invention has the arrangement shown in FIG. 5. More specifically, the video picture retrieving apparatus is basically comprised of a decoder section 101, a retrieval section 102, a retrieved result output section 103, and a retrieval key information input section 104. Of these components, the decoder section 101 serves to decode shape information. The decoder section 101 decodes the coded bit stream of an arbitrary shape object supplied through a coded bit stream input line 105 into shape information, and outputs the decoded shape information to a decoded information output line 106.

The retrieval section 102 retrieves the picture or scene desired by the user from the shape information supplied through the decoded information output line 106. More specifically, when the user inputs conditions and the like for a desired picture or scene with the retrieval key information input section 104, the information is supplied as retrieval key information to the retrieval section 102 through a retrieval key information input line 107. The retrieval section 102 compares this retrieval key information with the shape information from the decoder section 101 to retrieve the desired picture or scene defined by the retrieval key information, and outputs the retrieved result to the retrieved result output section 103. The retrieved result output section 103 is, for example, a display or printer, and presents the retrieved result from the retrieval section 102 to the user.

There will now be described the flow of the above processing in conjunction with FIGS. 7A and 7B.

First, as shown in FIGS. 5 and 7A, key information input by a user via the retrieval key information input section 104 (step F1). The bit stream is decoded every frame or every several frames (step F2). A desired scene is retrieved by the retrieval section 102, using the key information obtained in step F1 and the decoded result obtained in step F2 (step F3). When the retrieval result is obtained, the processing advances to step F4 wherein the retrieval result output section 103 provides the retrieved result. When the retrieval result is not obtained, the processing returns to step F2 to restart the decoding of the bit stream.

After the retrieved result is provided in step F4, it is determined in step F5 whether or not the entire bit stream has been decoded in step F2. If the entire bit stream is decoded, the processing is terminated.

In step F5, even when the user forcefully terminates a processing, the decoding is determined as having been completed. In this case, the processing may be cut off.

In FIG. 7A embodiment, the retrieved results are sequentially provided. In contrast, FIG. 7B embodiment provides the retrieved results together after the completion of decoding of the bit stream. In other words, first, key information is provided by a user via the retrieval key information input section (step F6). The bit stream is decoded every frame or every several frames in the decoder section 101 (step F7).

In step 8, a desired seine is retrieved by the retrieval section 102 using the key information obtained in step F6 and the decoded result obtained in step F7. When the retrieval result is obtained, the processing advances to step F9, while when the retrieval result is not obtained, the processing returns to step F7 to restart decoding of the bit stream.

In step F9, the indexes (e.g., the number (or time information) of the top frame of a scene obtained as a result) indicating the retrieved results are sequentially created by the retrieval section 102. The indexes are stored in the retrieval section 102 until they are requested by the retrieved result provider section 102.

In step F10, it is determined whether or not the decoding of the entire bit stream is completed in step F7. When the decoding of the entire bit stream is not completed, the processing returns to the step F7 to restart the decoding, while if the entire bit stream has been decoded, the processing is terminated. Even when the user forcefully terminates a processing in step 10, the decoding is determined as having been completed. In this case, the processing may be cut off.

This system having such an arrangement executes retrieval processing by using alpha-map data of the video data compressed/coded by MPEG4. The video data compressed/coded by MPEG4 has a picture component and an alpha-map information component obtained by binarizing an object shape or position information in the picture. The alpha-map information is therefore sent as the shape information A1 having the format shown in FIG. 2C. This information is used for retrieval processing.

In this video picture retrieving apparatus, the coded bit stream of an arbitrary shape object as information of an alpha-map is supplied to the decoder section 101 through the coded bit stream input line 105. The decoder section 101 decodes the coded bit stream into the shape information A1 and supplies the decoded shape information A1 to the retrieval section 102 through the decoded information output line 106. The retrieval section 102 compares the retrieval key information supplied from the user through the retrieval key information input line 107 with the shape information A1 supplied through the decoded information output line 106 to retrieve a desired picture or scene.

Assume that a given motion picture is compressed/coded by MPEG4, and the user wants to retrieve a picture of a close-up scene of a given character in the motion picture. In this case, if the user knows the overall contents of the motion picture and the picture layout of the desired scene, a user inputs information, e.g., the approximate size and location of the character in a picture, with the retrieval key information input section 104 (an input terminal, operation unit (not shown), or the like). This information is input as retrieval key information to the retrieval section 102 through retrieval key information input line 107.

The retrieved result output section 103 compares the retrieval key information from the user with the shape information A1 sequentially supplied through the decoded information output line 106 to search for information similar to the retrieval key information. If such information is present, the information is supplied to the retrieved result output section 103 through a retrieved result output line 108. The information is then presented by the retrieved result output section 103. That is, the information is displayed or printed. This presented information is a reconstructed picture of MPEG4 at this time. Upon seeing this picture, the user can know whether the picture is the target picture.

Note that the decoder section 101 may decode only the shape information A1 of the arbitrary shape object and retrieve the information instead of decoding all the object data.

A method of using only some of the three types of shape information A1 in MPEG4, i.e., mode information S1", "shape motion vector S2", and "coded binary picture information S3", is also available. Consider a case wherein information indicating the approximate position of a target object in a picture is supplied from the user as retrieval key information. In this case, since the target object is present in macroblocks in each of which the mode information S1 is set to one of mode 2 (MOOD 2) to mode 7 (MOOD 7), the retrieval section 102 may extract a picture in which mode 2 (MOOD 2) to mode 7 (MOOD 7) are distributed to almost coincide with the retrieval key information without completely reconstructing the shape.

For example, for a scene corresponding to a request to retrieve "a close-up scene" from the user can be retrieved by searching for a scene in which the number of macroblocks corresponding to mode 2 (MOOD 2) to mode 7 (MOOD 7) gradually increases for every frame. A scene corresponding to a request to retrieve a scene including two objects can be retrieved by searching for a scene in which macroblock corresponding to mode 2 (MOOD 2) to mode 7 (MOOD 7) can be grouped into two sets.

Assume that a predetermined scene continues, and a given frame is selected as a representative frame of the scene from a plurality of frames constituting the scene. In this case, when the retrieval section 102 retrieves a frame having the maximum number of macroblocks corresponding to mode 2 (MOOD 2) to mode 7 (MOOD 7), the retrieved result output section 103 may display a close-up of the target object. In addition, the size of the object may be estimated by decoding at least the value of the size (the values of vop-width, vop-height) of Bounding-Box and the value of the position (spatial-reference) thereof. In this case, the information of reconstructed Bounding-Box is output from the line 106 shown in FIG. 5.

According to the method of the above embodiment, when a picture including a target object is to be retrieved, and the user knows the approximate position of the object in the picture, the picture can be retrieved by determining the position of the object in the picture in accordance with mode information contained in shape information in a data format conforming to MPEG4. If, however, the more approximate position of a target object is allowed, a target picture may be determined by decoding only a position vector.

A picture can also be retrieved by using state information as key information, e.g., information indicating that the object is gradually crushed in the vertical direction or information indicating that the shape abruptly changes. That is, by retrieving a target picture using state information as key information, the user can search out the corresponding picture.

In MPEG4, the shape motion vector S2 indicates how the shape changes with time. If, therefore, key information indicating that an object is gradually crushed in the vertical direction is supplied, a corresponding motion vector may be searched out. If key information indicating that a shape abruptly changes is supplied, a scene whose motion vector abruptly changes may be searched out.

The above retrieving method is used when the state of a picture is known. However, a target object or picture can be retrieved by using a camera parameter as retrieval information. A corresponding embodiment will be described below.

Although a target object or picture is retrieved by using a camera parameter as retrieval information, since MPEG4 has no camera parameter as information, a camera parameter is estimated from a picture. When a camera parameter is supplied as retrieval key information, the retrieval section 102 estimates a camera parameter from shape information (alpha-map) of MPEG4, and a picture is retrieved by using the estimated camera parameter as retrieval key information. This case will be described below as the first example.

In MPEG4, since shape information (alpha-map) is prepared, and the alpha-map is made up of a plurality of macroblocks, mode information of each of these macroblocks is used. More specifically, a zoom parameter for the camera can be estimated by obtaining a state in which the size of an object changes with time on the basis of the number of macroblocks of mode 2 (MOOD 2) to mode 7 (MOOD 7) or the value of (vop_width, vop_height).

In addition, a pan/tilt parameter for the camera can be estimated by obtaining a change in the position of an object with time on the basis of shape motion vector information or position vector (spatial_reference).

A method of obtaining a camera parameter will be described in detail below as the second example.

To obtain a more precise camera parameter than that in the first example, decoded shape information is deformed by affine transform to perform matching between frames. With this operation, detailed camera parameters, such as "zoom", "pan", and "tilt", can be obtained.

The amount of processing for matching can be reduced by using only decoded pixel values in "boundary macroblocks" instead of using all the pixel values of decoded shape information.

In the case described above, a camera parameter is estimated from shape information (alpha-map) of MPEG4, and a picture is retrieved by using the estimated camera parameter as retrieval key information. MPEG4 uses a technique of writing a scenario indicating how a target object in a picture is developed, and developing the picture according to the contents of the scenario. This scenario is implemented by information called a scene description object. The third example in which a target picture is retrieved from the information of this scene description object will be described next.

Figure 6:
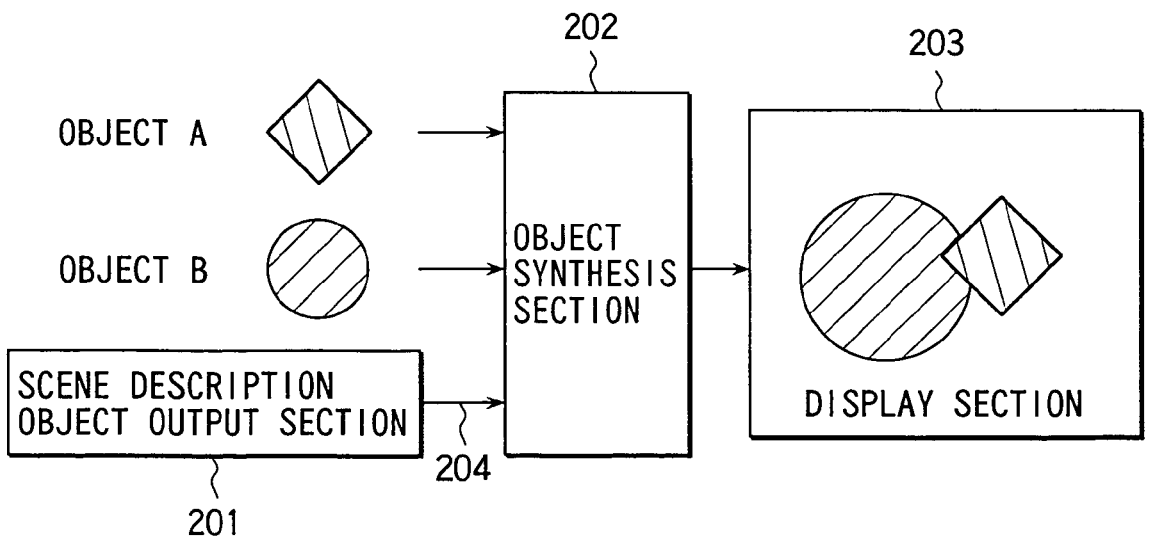
FIG. 6 is a block diagram showing the schematic arrangement of a video picture retrieving apparatus having a display section for synthesizing objects and displaying the resultant information according to the second embodiment of the present invention.

FIG. 6 shows a selecting section for selecting a representative frame as a unit for presenting a retrieval result from information of a scene description object. This selecting section includes a scene description object output section 201, object synthesis section 202, and display section 203. In this case, the scene description object output section 201 outputs information as a scenario which has been written by a contents producer to designate the composition of a picture.

In a coding scheme based on MPEG4, a plurality of objects (for example, objects A and B in FIG. 6) are generally reconstructed by the decoder section 101 which has decoded a bit stream. These objects are synthesized in accordance with the scene description object output section 201. Thereafter, the resultant object is supplied to the display section 203 to be presented to the user. In this manner, the object synthesis section 202 synthesizes objects and outputs the resultant object.

In this case, the data from the scene description object output section 201 is multiplexed with data of another object and supplied. The display section 203 may be identical to the retrieved result output section 103 or not.

In the third example, when a given frame is to be selected from a predetermined scene to be displayed as a representative frame of the scene on the retrieved result output section 103, the scene description object decoded by the scene description object decoder section 18 on the decoder apparatus side is supplied from the scene description object output section 201 to the object synthesis section 202 through a scene description object input line 204.

The object synthesis section 202 analyzes the information (e.g., "enlarging and displaying object B" or "synthesizing object A with the foreground of object B") of a scene description object to search for a frame coinciding with a predetermined condition, and sets the frame as a representative frame.

The above "predetermined condition" is, for example, a condition indicating that when a specific object is closed up, the area of the object is computed and a frame corresponding to the maximum area of the object is set as a representative frame in the object synthesis section 202.

As described above, according to the present invention, by using shape information (size, shape, motion, and position in a picture) of an object, sophisticated video picture retrieval can be implemented in consideration of the contents of a picture without requiring any complicated signal processing unit.

In the above embodiments, the retrieval operation is performed using the shape information provided in the macroblock. However, the retrieval operation may be performed using the header information. In this case, the header block includes information spatial_reference, vop_width, and vop-height shown in FIG. 1. The retrieval operation is performed on the basis of the above information of the header. In other words, the video picture may be retrieved using a position of the object within the frame which is indicated by the information vop-reference, a horizontal size of the object which is indicated by the information vop-width, a vertical size of the object which is indicated by the information vop-height, and an area of the bounding box surrounding the object which is indicated by vop-width and vop-height.

As has been described in detail, according to the present invention, by using shape information (size, shape, motion, and position in a picture) of an object, there is provided a video picture retrieving method and apparatus which can implement sophisticated video picture retrieval in consideration of the contents of a picture without requiring any complicated signal processing unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of retrieving a video picture, comprising:
    decoding a coded bit stream of video data representing an arbitrarily shaped object to sequentially generate a plurality of decoded shape information corresponding to a plurality of video pictures, said coded bit stream including shape information and texture information, and the shape information representing a shape and a position in a picture;
    inputting key information for retrieval of a desired picture to a retrieval unit; and
    retrieving from the plurality of video pictures a video picture corresponding to the retrieval key information by comparing the retrieval key information with each of the plurality of decoded shape information in the retrieval unit.

2. A method according to claim 1, wherein
    the step of decoding includes decoding only the shape information of the coded bit stream in decoding the bit stream; and
    the step of retrieving includes retrieving the video picture by using only the decoded shape information.

3. A method according to claim 1, wherein,
    when the shape information includes at least mode information in units of blocks in coding operation,
    the step of decoding includes decoding only the mode information of the bit stream when decoding the coded bit stream; and
    the step of retrieving includes retrieving the video picture by using the mode information.

4. A method according to claim 1, wherein,
    when the shape information includes at least shape motion vector information in coding operation,
    the step of decoding includes decoding only the shape motion vector information of the coded bit stream when decoding the bit stream; and
    the step of retrieving includes retrieving the video picture by using the shape motion vector information.

5. A method according to claim 1, wherein,
    when the shape information includes at least position vector information representing a position of the object in coding operation,
    the step of decoding includes decoding only the position vector information of the coded bit stream when decoding the bit stream; and
    the step of retrieving includes retrieving the video picture by using the position vector information.

6. A method according to claim 1, further comprising:
    computing an area of an object from the shape information, wherein
    the step of retrieving includes determining a frame having a large area as a representative frame representing contents of a retrieved result.

7. A method according to claim 1, wherein the step of retrieving comprises:
    estimating a camera parameter from the shape information; and retrieving the video picture having the camera parameter.

8. A method according to claim 7, wherein the step of estimating comprises:
    estimating the camera parameter on the basis of mode information of a shape and motion vector information.

9. A method according to claim 7, wherein the step of estimating comprises:
    estimating the camera parameter on the basis of reconstructed shape information.

10. A method of retrieving a video picture, comprising:
    decoding a coded bit stream of an arbitrarily shape object to sequentially generate a plurality of decoded shape information, said coded bit stream including a plurality of shape information and texture information and corresponding to video data coded by MPEG4, and the shape information representing a shape and a position in a picture;

retrieving a video picture corresponding to retrieval key information to a retrieval unit by comparing the retrieval key information with each of the plurality of decoded shape information in the retrieval unit; and presenting the retrieved video picture.

11. An apparatus configured to retrieve a video picture, comprising:

a decoder configured to decode a coded bit stream of video picture data representing an arbitrarily shaped object to sequentially generate a plurality of decoded shape information, the coded bit stream including shape information and texture information, and the shape information representing a shape and a position in a picture;

a retrieval key information input unit configured to input a retrieval key information; and a retrieval unit configured to compare the retrieval key information with each of the plurality of decoded shape information and retrieve from the coded bit stream a video picture corresponding to the retrieval key information.

12. An apparatus according to claim 11, wherein said decoder and said retrieval unit respectively comprise:

a decoder configured to decode only shape information of the coded bit stream in decoding the bit stream; and a retrieval unit configured to retrieve the video picture by using only the shape information.

13. An apparatus according to claim 11, wherein, when the shape information includes at least mode information in units of blocks in coding operation, said decoder unit and said retrieval unit respectively comprise:

a decoder configured to decode only the mode information in the bit stream when decoding the coded bit stream; and a retrieval unit configured to retrieve the video picture by using the mode information.

14. An apparatus according to claim 11, wherein, when the shape information includes at least shape motion vector information in a coding operation, said decoder unit and said retrieval unit comprises:

a decoder configured to decode only the shape motion vector information of the coded bit stream when decoding the bit stream; and a retrieval unit configured to retrieve the video picture by using the shape motion vector information.

15. An apparatus according to claim 11, wherein, when the shape information includes at least position vector information representing a position of an object in a coding operation, said decoder unit and said retrieval unit respectively comprise:

a decoder configured to decode only the position vector information of the coded bit stream when decoding the bit stream; and a retrieval unit configured to retrieve the video picture by using the position vector information.

16. An apparatus according to claim 11, further comprising:

a computer configured to compute an area of an object from the shape information, wherein said retrieval unit is configured to determine a frame in which a large area is occupied by the object as a representative frame representing contents of a retrieved result.

17. An apparatus according to claim 11, wherein said retrieval unit comprises:

an estimator configured to estimate a camera parameter from shape information, wherein said retrieval unit is configured to retrieve a video picture having the camera parameter and which corresponds to a supplied retrieval condition.

18. An apparatus according to claim 17, wherein said estimator comprises:

an estimator configured to estimate a camera parameter on the basis of mode information of a shape and motion vector information.

19. An apparatus according to claim 17, wherein said estimator comprises:

an estimator configured to estimate a camera parameter on the basis of reconstructed shape information.

20. A video picture retrieving apparatus configured to retrieve a desired picture from video data coded by MPEG4, comprising:

a decoder configured to decode a coded bit stream of an arbitrarily shaped object to sequentially generate a plurality of decoded shape information corresponding to a plurality of video pictures coded by MPEG4, the coded bit stream including shape information and texture information, and the shape information representing a shape and a position in a picture;

a retrieval condition key information input unit configured to input retrieval key information;

a retrieval unit configured to compare the retrieval key information with each of the plurality of decoded shape information and retrieve from the plurality of video pictures coded by MPEG4 the desired picture; and an output unit configured to present the desired picture.

* * * * *